(12) United States Patent
Sim et al.

(10) Patent No.: US 10,970,631 B2
(45) Date of Patent: Apr. 6, 2021

(54) METHOD AND APPARATUS FOR MACHINE LEARNING

(71) Applicant: Autocrypt Co., Ltd., Seoul (KR)

(72) Inventors: Sang Gyoo Sim, Seoul (KR); Seok Woo Lee, Seoul (KR); Seung Young Park, Chuncheon-si (KR); Duk Soo Kim, Seoul (KR)

(73) Assignee: AUTOCRYPT CO., LTD., Seoul (KR)

( * ) Notice: Subject to any disclaimer, the term of this patent is extended or adjusted under 35 U.S.C. 154(b) by 115 days.

(21) Appl. No.: 15/908,420

(22) Filed: Feb. 28, 2018

(65) Prior Publication Data
US 2019/0050728 A1 Feb. 14, 2019

(30) Foreign Application Priority Data
Aug. 9, 2017 (KR) .......................... 10-2017-0101084

(51) Int. Cl.
G06N 3/08 (2006.01)
G06K 9/66 (2006.01)
(Continued)

(52) U.S. Cl.
CPC ............. *G06N 3/08* (2013.01); *G06K 9/6267* (2013.01); *G06K 9/66* (2013.01); *G06N 3/04* (2013.01);
(Continued)

(58) Field of Classification Search
CPC .......... G06N 3/08; G06N 3/04; G06N 3/0454; G06N 3/084; G06N 3/0445; G06N 3/0472;
(Continued)

(56) References Cited

U.S. PATENT DOCUMENTS

2007/0086655 A1* 4/2007 Simard ................ G06K 9/4628
382/190
2012/0065976 A1* 3/2012 Deng ...................... G10L 15/14
704/256.1
(Continued)

FOREIGN PATENT DOCUMENTS

KR 10-1644998 B1 7/2016
KR 10-2016-0143505 A 12/2016
(Continued)

OTHER PUBLICATIONS

Conway, Packing Lines, Planes, etc.: Packings in Grassmannian Spaces, Aug. 1, 2002, pp. 36, arXiv:math/0208004v1,[math.Co], arXiv.org (Year: 2002).*

(Continued)

*Primary Examiner* — Li B. Zhen
*Assistant Examiner* — Henry Nguyen
(74) *Attorney, Agent, or Firm* — Goldilocks Zone IP Law

(57) ABSTRACT

Provided is a method of machine learning for a convolutional neural network (CNN). The method includes: receiving input target data; determining whether to initiate incremental learning on the basis of a difference between a statistical characteristic of the target data with respect to the CNN and a statistical characteristic of previously used training data with respect to the CNN; determining a set of kernels with a high degree of mutual similarity in each convolution layer included in the CNN when the incremental learning is determined to be initiated; and updating a weight between nodes to which kernels included in the set of kernels with a high degree of mutual similarity are applied.

10 Claims, 9 Drawing Sheets

(51) Int. Cl.
*G06N 3/04* (2006.01)
*G06K 9/62* (2006.01)

(52) U.S. Cl.
CPC ............ *G06N 3/0454* (2013.01); *G06N 3/084* (2013.01); *G06N 3/0445* (2013.01); *G06N 3/0472* (2013.01); *G06N 3/082* (2013.01); *G06N 3/088* (2013.01)

(58) Field of Classification Search
CPC ...... G06N 3/082; G06N 3/088; G06K 9/6267; G06K 9/66
See application file for complete search history.

(56) References Cited

U.S. PATENT DOCUMENTS

| | | | |
|---|---|---|---|
| 2015/0278200 A1* | 10/2015 | He | G06F 17/2785 704/2 |
| 2016/0335536 A1 | 11/2016 | Yamazaki et al. | |
| 2016/0358070 A1* | 12/2016 | Brothers | G06N 3/0454 |
| 2017/0220904 A1 | 8/2017 | Bai et al. | |
| 2017/0357896 A1* | 12/2017 | Tsatsin | G06N 3/0454 |
| 2018/0060724 A1* | 3/2018 | Wang | G06N 3/082 |
| 2018/0260416 A1* | 9/2018 | Elkaim | G06F 17/16 |

FOREIGN PATENT DOCUMENTS

| | | |
|---|---|---|
| KR | 10-20170068360 A | 6/2017 |
| KR | 10-2017-0106540 A | 9/2017 |

OTHER PUBLICATIONS

Joao Gama et al. Learning with Drift Detection, 2004, pp. 1-10, Brazilian symposium on artificial intelligence. Springer, Berlin, Heidelberg, (Year: 2014).*

Zhao et al. "A survey on deep learning-based fine-grained object classification and semantic segmentation", Jan. 2017, International Journal of Automation and Computing, pp. 120-135 (Year: 2017) (Year: 2017).*

Conway, Packing Lines, Planes, etc.: Packings in Grassmannian Spaces, Aug. 1, 2002, pp. 36, arXiv:math/0208004v1,[math.Co], arXiv.org (Year: 2002) (Year: 2002).*

Joao Gama etal. Learning with Drift Detection, 2004, pp. 1-10, Brazilian symposium on artificial intelligence. Springer, Berlin, Heidelberg, (Year: 2014) (Year: 2014).*

Zhao et al. "A survey on deep learning-based fine-grained object classification and semantic segmentation", Jan. 2017, International Journal of Automation and Computing, pp. 120-135 (Year: 2017) (Year: 2017).*

Verleysen, Michel, et al. "On the effects of dimensionality on data analysis with neural networks." International Work-Conference on Artificial Neural Networks. Springer, Berlin, Heidelberg, 2003. (Year: 2003).*

Zhang et al., Text Understanding from Scratch, Apr. 4, 2016,10 pages, arXiv:1502.01710v5 [cs.LG], arXiv.org.

Zhou et al., Online Incremental Feature Learning with Denoising Autoencoders, Proceedings of the 15th International Conference on Artificial Intelligence and Statistics, 2012, pp. 1454-1461, vol. XX of JMLR, W&CP XX.

Bengio,Greedy Layer-Wise Training of Deep Networks, Dec. 4-6, 2006, pp. 153-160, NIPS'06 Proceedings of the 19th International Conference on Neural Information Processing Systems.

Srivastava et al., Dropout: A Simple Way to Prevent Neural Networks from Overfilling, Jun. 14, 2014, pp. 1929-1958, Journal of Machine Learning Research.

Goodfellow et al., Maxout Networks, 2013, 9 pages, vol. 28, Proceedings of the 30 th International Conference on Machine Learning,JMLR: W&CP.

Conway, Packing Lines, Planes, etc: Packings in Grassmannian Spaces, Aug. 1, 2002, pp. 36, arXiv: math/0208004v1,[math.Co], arXiv.org.

Hawkins et al., Outlier Detection Using Replicator Neural Networks, Sep. 2, 2002, pp. 170-180, LNCS, vol. 2454, Data Warehousing and Knowlege Discovery.

Zeiler et al., Visualizing and Understanding Convolutional Networks, 2014, pp. 818-833, ECCV 2014, Part I, LNCS 8689, Springer International Publishing Switzerland.

Joao Gama et al. Learning with Drift Detection, 2004, pp. 1-10, Brazilian symposium on artificial intelligence. Springer, Berlin, Heidelberg.

Office Action dated Mar. 29, 2018 of Korean Patent Application No. 10-2017-0101084, which corresponds to the above referenced application.

Robi Polikar et al. "Learn++: An incremental learning algorithm for supervised neural networks." IEEE transactions on systems, man, and cybernetics, part C (applications and reviews) Nov. 2001,pp. 497-508, vol. 31.No.4.

Communication of from Korean Patent Office, Decision to grant a patent for Korean Application No. KR10-2017-0101084, which corresponds to this application, dated Jun. 18, 2018.

* cited by examiner

METHOD AND APPARATUS FOR MACHINE LEARNING

CLAIM FOR PRIORITY

This application claims priority to Korean Patent Application No. 2017-0101084 filed on Aug. 9, 2017 in the Korean Intellectual Property Office (KIPO), the entire contents of which are hereby incorporated by reference.

BACKGROUND

1. Technical Field

Example embodiments of the present invention relate to a method and apparatus for machine learning, and more particularly, to a method and apparatus for machine learning to improve a convolutional neural network.

2. Related Art

Machine learning, which is a type of artificial intelligence (AI), refers to a process of performing predictive tasks, such as regression, classification, and clustering, based on content learned by a computer itself on the basis of data.

Deep learning is one field of machine learning to teach a computer the human way of thinking and may be defined as a set of machine learning algorithms that attempt a high level of abstraction (a task of summarizing core contents or functions in a large quantity of data or complex materials) through a combination of a number of nonlinear transformation mechanisms.

A deep learning architecture is a concept designed based on artificial neural networks (ANNs). An ANN is an algorithm that mathematically models virtual neurons and simulates the model to achieve a learning ability similar to that of a human brain. The ANN is mainly used in pattern recognition. An ANN model used in deep learning has a structure in which linear fitting and a nonlinear transformation or activation are repeatedly stacked. A neural network model used in deep learning may include a deep neural network (DNN), a convolutional neural network (CNN), a recurrent neural network (RNN), a restricted Boltzmann machine (RBM), a deep belief network (DBN), a deep Q-network, and the like.

In a training process of deep learning, parameters of the ANN model may be optimized with training data. However, the amount of training data cannot be increased infinitely. Hence, performance of the ANN may be limited when a prediction is performed on data which has statistical characteristics different from those of training data used in training.

In order to solve the above drawbacks, there is a need for an incremental learning method of an ANN which can improve a prediction performance for data having statistical characteristics different from those of training data.

SUMMARY

Accordingly, example embodiments of the present invention are provided to substantially obviate one or more problems due to limitations and disadvantages of the related art.

Example embodiments of the present invention provide a method and apparatus for identifying some nodes of an artificial neural network that are to be updated in order to improve a prediction performance for target data which has statistical characteristics different from those of training data.

In some example embodiments, a method of machine learning for a convolutional neural network (CNN) includes: receiving input target data; determining whether to initiate incremental learning on the basis of a difference between a statistical characteristic of the target data with respect to the CNN and a statistical characteristic of previously used training data with respect to the CNN; determining a set of kernels with a high degree of mutual similarity in each of convolution layers included in the CNN when the incremental learning is determined to be initiated; and updating a weight between nodes to which kernels included in the set of kernels with a high degree of mutual similarity are applied.

The determining of whether to initiate the incremental learning may include comparing a maximum value among output values of the CNN regarding the target data with a predetermined reference value and determining to initiate the incremental learning when the maximum value is less than the reference value.

When the target data is a data array consisting of a plurality of pieces of data, it may be determined that the incremental learning is initiated when the number of pieces of data, which are included in the data array and satisfy a condition in which a maximum value among output values of the CNN is less than the predetermined reference value, is greater than or equal to a reference number.

The determining of the set of kernels with a high degree of mutual similarity may include determining at least one pair of the kernels with a high degree of mutual similarity by measuring a distance or similarity between kernels.

The determining of the set of kernels with a high degree of mutual similarity may include determining at least one pair of the kernels with a high degree of mutual similarity on the basis of at least one among an absolute value of a difference between the kernels, a chordal distance, KL divergence, an intersection kernel, or a Chi-square kernel.

The determining of the set of kernels with a high degree of mutual similarity may include constructing concatenated kernel matrices from kernels used in a convolution operation of the same node and determining at least one pair of the kernels with a high degree of mutual similarity by measuring a distance or similarity between the concatenated kernel matrices.

The determining of the set of kernels with a high degree of mutual similarity may include determining the set of kernels with a high degree of mutual similarity on the basis of at least one of an absolute value of a difference between the concatenated kernel matrices, a squared difference between the concatenated kernel matrices, p-norm, Frobenius-norm, a chordal distance, KL divergence, an intersection kernel, and a Chi-square kernel.

The method may further include updating each of the kernels included in the set of kernels with a high degree of mutual similarity using a random matrix.

The method may further include, when it is determined that the incremental learning is initiated, determining a set of weight vectors with a high degree of mutual similarity in each fully connected layer included in the CNN and updating a weight between nodes to which weight vectors included in the set of weight vectors with a high degree of mutual similarity are applied.

The determining of the set of weight vectors with a high degree of mutual similarity may include determining at least one pair of the weight vectors with a high degree of mutual similarity by measuring a distance or similarity between weight vectors.

The determining of the set of weight vectors with a high degree of mutual similarity may include determining at least one pair of the weight vectors with a high degree of mutual similarity on the basis of at least one of an absolute value of a difference between weight vectors, a squared difference, p-norm, Euclidean-norm, a cosine distance, a Mahalanobis distance, a chordal distance, KL divergence, an intersection kernel, and a Chi-square kernel.

The method may further include updating each weight vector included in the set of weight vectors with a high degree of mutual similarity using a random vector.

The updating of the weight between the nodes may include updating the weight between the nodes using at least one of a supervised learning method and an unsupervised learning method.

When the weight between the nodes is updated using the unsupervised learning method, an output of the CNN may be input to a symmetric neural network which is structurally symmetrical to the CNN and the weight between the nodes may be updated on the basis of a difference between an output of the symmetric neural network and an input to the CNN.

The symmetric neural network may include a backward fully connected layer corresponding to a whole connection layer of the CNN and a deconvolution layer and an unpooling layer which correspond to a convolution layer and a pooling layer of the CNN.

In other example embodiments, an apparatus for machine learning for training a convolutional neural network (CNN) includes: a processor; and a memory in which at least one command executed by the processor is stored, wherein the at least one command is executed to: receive input target data; determine whether to initiate incremental learning on the basis of a difference between a statistical characteristic of the target data with respect to the CNN and a statistical characteristic of previously used training data with respect to the CNN; determine a set of kernels with a high degree of mutual similarity in each of convolution layers included in the CNN when the incremental learning is determined to be initiated; and update a weight between nodes to which kernels included in the set of kernels with a high degree of mutual similarity are applied.

The at least one command may be executed to determine at least one pair of the kernels with a high degree of mutual similarity on the basis of at least one of an absolute value of a difference between the kernels, a chordal distance, KL divergence, an intersection kernel, and a Chi-square kernel.

The at least one command may be executed to construct concatenated kernel matrices from kernels used in a convolution operation of the same node and determine at least one pair of the kernels with a high degree of mutual similarity on the basis of at least one of an absolute value of a difference between the concatenated kernel matrices, a squared difference, p-norm, Frobenius-norm, a chordal distance, KL divergence, an intersection kernel, and a Chi-square kernel.

The at least one command may be executed, when it is determined that the incremental learning is initiated, to determine a set of weight vectors with a high degree of mutual similarity in each of fully connected layers included in the CNN and update a weight between nodes to which weight vectors included in the set of weight vectors with a high degree of mutual similarity.

The at least one command may be executed to determine at least one pair of the weight vectors with a high degree of mutual similarity on the basis of an absolute value of a difference between weight vectors.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Figure 1:
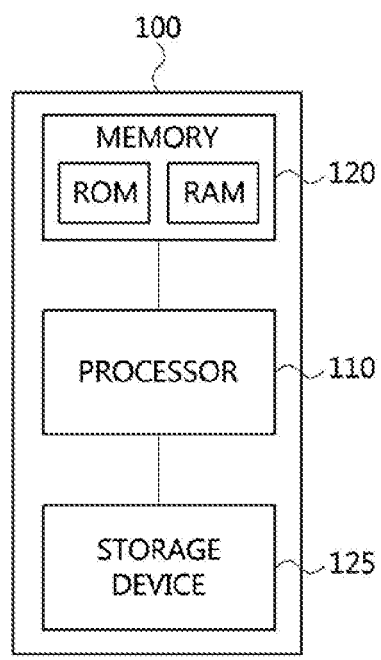
FIG. 1 is a block diagram illustrating an apparatus for machine learning according to one example embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and are not to be construed as being limited to the example embodiments of the present invention set forth herein.

Accordingly, while the invention is susceptible to various modifications and alternative forms, specific embodiments thereof are shown by way of example in the drawings and will herein be described in detail. However, it should be understood that there is no intent to limit the invention to the particular forms disclosed, rather the invention is to cover all modifications, equivalents, and alternatives falling within the spirit and scope of the invention. Like numbers refer to like elements throughout the description of the figures.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

It should be understood that when an element is referred to as being "connected" or "coupled" to another element, the element can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises," "comprising," "includes." and/or "including." when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, exemplary embodiments of the present invention will be described in detail with reference to the accompanying drawings. In order to facilitate overall understanding of the invention, like reference numerals in the drawings denote like elements, and thus the description thereof will not be repeated.

In the specification, training data refers to data previously used in training an artificial neural network (ANN). Target data is new data input to the ANN and may be data different from the previously used training data. The target data may be new training data different from previously used training data. In another example, the target data may be data to be analyzed by the ANN FIG. 1 is a block diagram illustrating an apparatus 100 for machine learning according to one example embodiment of the present invention.

Referring to FIG. 1, the apparatus 100 for machine learning according to the example embodiment may include at least one processor 110, a memory 120, a storage device 125, and the like.

The processor 110 may execute a program command stored in the memory 120 and/or the storage device 125. The processor 110 may refer to a central processing unit (CPU), a graphics processing unit (GPU), or a dedicated processor for performing methods according to the present invention. The memory 120 and the storage device 160 may be configured as a volatile storage medium and/or a non-volatile storage medium. For example, the memory 120 may be configured as a read only memory (ROM) and/or a random access memory (RAM).

At least one command to be executed by the processor 110 may be stored in the memory 120.

The command stored in the memory 120 may be updated by machine learning of the processor 110. The processor 110 may change the command stored in the memory by machine learning. The machine learning performed by the processor 110 may be conducted in a supervised learning method or an unsupervised learning method. However, embodiments of the present invention are not limited thereto. For example, the machine learning may be performed in a different manner, such as reinforcement learning.

Figure 2:
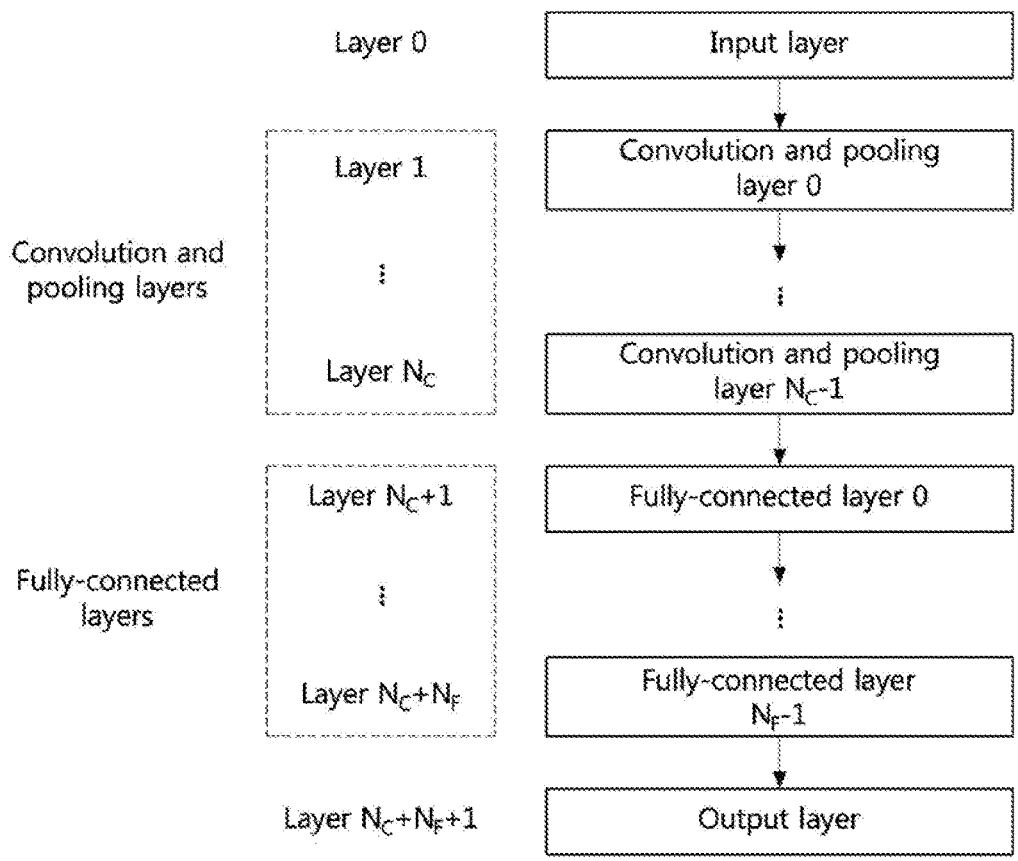
FIG. 2 is a conceptual diagram illustrating a convolutional neural network (CNN) according to a first embodiment of the present invention.

FIG. 2 is a conceptual diagram illustrating a convolutional neural network (CNN) according to a first embodiment of the present invention.

Referring to FIG. 2, the CNN may include at least one convolution and polling layer and at least one fully connected layer. Although FIG. 2 shows an example in which convolution and pooling operations are performed on one layer, embodiments of the present invention are not limited thereto. For example, a layer on which a convolutional operation is performed and a layer on which a pooling operation is performed may be separate from each other. In addition, the CNN may not perform a pooling operation.

The CNN may extract a feature of input data, generate output data having a scale smaller than that of the input data, and output the generated data. The CNN may receive an image or a matrix corresponding to the image. The data that can be input to the CNN may not be limited to a general image. For example, the CNN may receive a braille image generated from a string.

Figure 3:
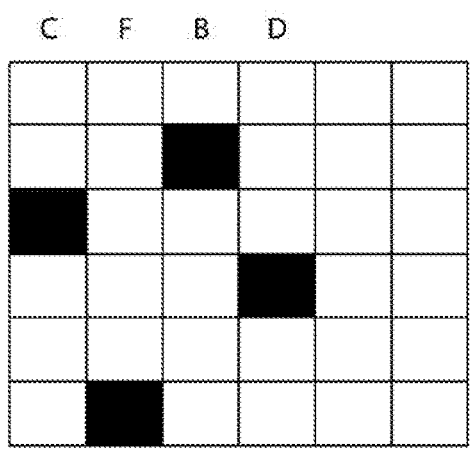
FIG. 3 is a conceptual diagram illustrating a braille image generated from a string.

FIG. 3 is a conceptual diagram illustrating a braille image generated from a string.

Referring to FIG. 3, a braille image may be generated using a method in which a string is transformed into a matrix form by transforming characters of the string into one-hot vectors in reverse order from the last character to the first character. Only one element of the one-hot vector may be "1" and the other elements may be "0", or all elements may be "0". A position of the element having a value of 1 in the one-hot vector may vary depending on a type of character represented by the one-hot vector. For example, as shown in FIG. 3, each of the one-hot vectors corresponding to alphabets C, F, B, and D may have an element with a value of "1" at a different position. The braille image shown in FIG. 3 is merely illustrative, and the embodiment is not limited thereto. For example, a size of the one-hot vector may be greater than the size shown in FIG. 3. One-hot vectors may represent a text set of "abcdefghijklmnopqrstuvwxyz 0123456789-,;.!?:'\"∧\|_@#$%^&*~'+-=< >( )[ ] { }". The position of an element with a value of "1" in the one-hot vector may vary depending on the order of characters represented by the one-hot vector.

The convolution and pooling layer may receive an input image or an input matrix and perform a convolution operation on the input image or matrix.

Figure 4:
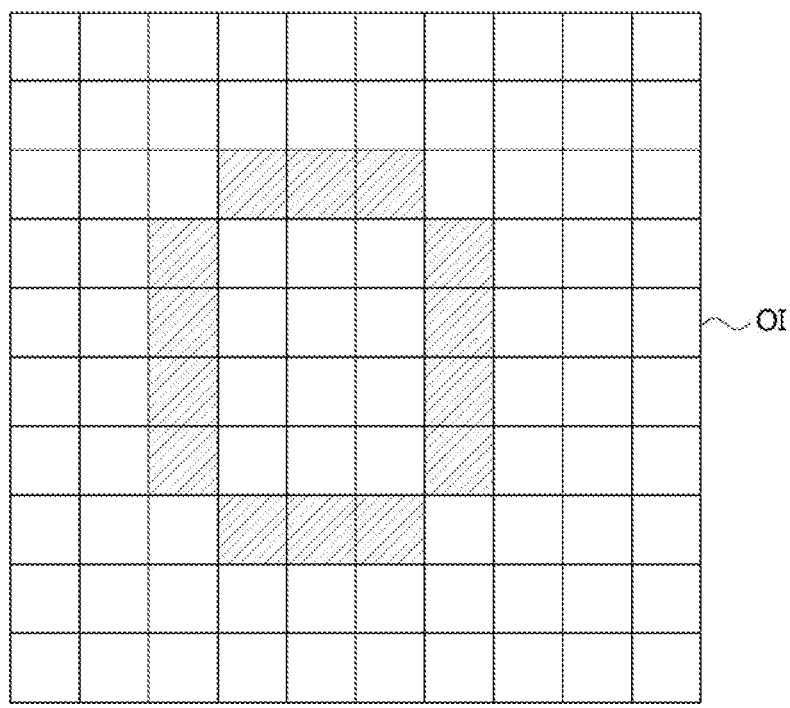
FIG. 4 is a conceptual diagram illustrating an example of a convolution operation.

FIG. 4 is a conceptual diagram illustrating a convolution operation.

Referring to FIG. 4, the processor 110 may perform a convolution operation on an input image OI using a kernel FI. The kernel FI may be a matrix with a smaller size than the number of pixels of the image OI. For example, element (1, 1) of a filter kernel FI may be 0. Thus, when the convolution is calculated, a pixel of the image OI corresponding to element (1,1) of the kernel FI may be multiplied by 0. In another example, element (2,1) of the kernel FI is 1. Thus, when the convolution is calculated, a pixel of the image OI corresponding to element (2,1) of the kernel FI may be multiplied by 1.

The processor 110 may perform the convolution operation on the image OI by changing the position of the kernel FI on the image OI. In addition, the processor 110 may output a convolution image from the calculated convolution values.

Figure 5:
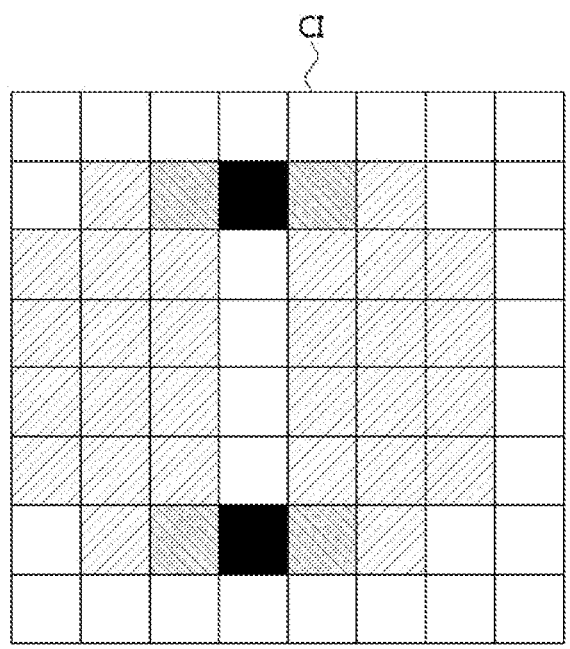
FIG. 5 is a conceptual diagram illustrating a case in which a processor extracts a convolution image from an image shown in FIG. 4.

FIG. 5 is a conceptual diagram illustrating a case in which the processor 110 extracts the convolution image from the image OI shown in FIG. 4

Figure 6:
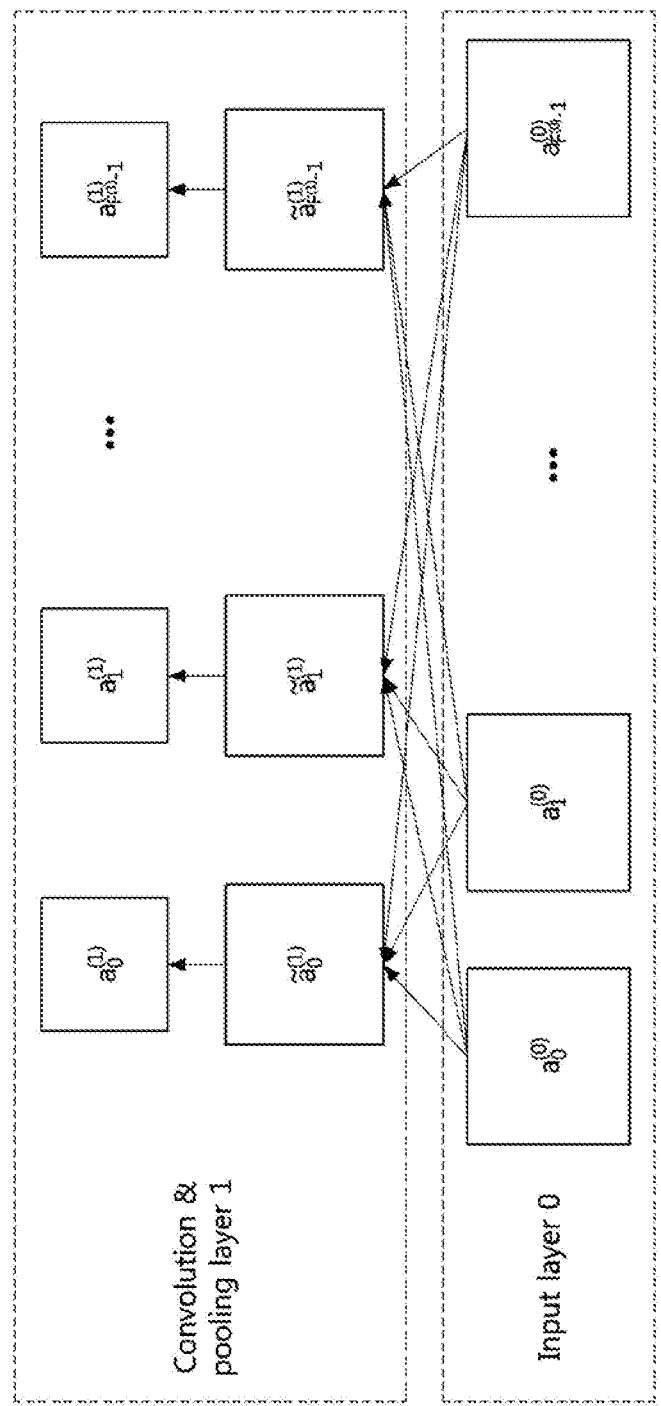
FIG. 6 is a conceptual diagram illustrating an operation of a convolution and pooling layer shown in FIG. 2.

Since the number of cases in which the filter kernel FI shown in FIG. 4 can be moved on the image OI is (10−3+1)×(10−3+1)=8×8, the processor 110 may calculate 64 (8×8) convolution values. In addition, a convolution image of 8×8 pixel size may be extracted from the 8×8 convolution values, as shown in FIG. 6. The number of pixels of the convolution image CI becomes less than the number of pixels of the original image OI. By using the kernel FI, the processor 110 may be able to extract the convolution image CI in which a characteristic of the original image is reflected. By using the kernel FI, the processor 110 may output the convolution image CI which has a smaller size than that of the input image and in which the characteristic of the input image OI is reflected. The convolution operation may be performed on the convolution layer or a convolution and pooling layer.

FIG. 6 is a conceptual diagram illustrating an operation of the convolution and pooling layer shown in FIG. 2.

In FIG. 6, for convention of illustration, only input layer 0 and convolution and pooling layer 1 of a CNN are shown. Referring to FIG. 6, the input layer may receive a plurality of input images. The input layer may receive a plurality of matrices. The input images may be transferred to nodes which perform a convolution operation on the convolution and pooling layer. $F^{(0)}$ input images may have a size of $M^{(0)} \times L^{(0)}$. For example, in the case of an RGB image of 128×128, there may be images of $F^{(0)}=3$ and $M^{(0)}=L^{(0)}=128$, and in the case of a string composed of 68 kinds of 1000 characters, the string is transformed into images of $F^{(0)}=68$, $M^{(0)}=1$, and $L^{(0)}=1000$ through a process illustrated in FIG. 3.

The input images may be input to each of the nodes that perform a convolution operation on the first convolution and pooling layer. The nodes performing the convolution operation may perform the convolution operation on the input images in a similar manner as described with reference to FIGS. 4 and 5. For example, the convolution operation performed on the first convolution and pooling layer may be expressed as Equation 1.

$$\tilde{a}_k^{(1)}(x, y) = \Phi^{(1)}\left(\sum_{k'=0}^{F^{(0)}-1} \sum_{u=0}^{G^{(1)}-1} \sum_{v=0}^{K^{(1)}-1} W_{kk'}^{(1)}(u, v) a_{k'}^{(0)}(x+u, y+v) + b_k^{(1)}\right) \quad (1)$$

$$= \Phi^{(1)}\left(\sum_{k'=0}^{F^{(0)}-1} W_{kk'}^{(1)} * a_{k'}^{(0)} + b_k^{(1)}\right) \quad * \to 2D \text{ 'valid' convolution}$$

$$= \Phi^{(1)}(z_k^{(1)}(x, y))$$

for $0 \le x \le M^{(0)} - G^{(1)}$, $0 \le y \le L^{(0)} - K^{(1)}$, and $0 \le k \le F^{(1)} - 1$ In Equation 1, $\Phi^{(1)}(\cdot)$ denotes an activation function. The activation function may include a sigmoid function, a hyper tangent function, a rectifier linear unit, and the like.

$F^{(0)}$ denotes the number of input images or input matrices. $F^{(1)}$ denotes the number of images or matrices output from the first convolution and pooling layer by a convolution operation. $G^{(1)}$ denotes the number of rows of a kernel used for a convolution operation in the first convolution and pooling layer. $K^{(1)}$ denotes the number of columns of a kernel used for a convolution operation in the first convolution and pooling layer. $W_{kk'}^{(1)}(u,v)$ denotes a kernel that the $k^{th}$ node uses in performing a convolution operation on the $k'^{th}$ input image in the first convolution and pooling layer. $a_{k'}^{(0)}(x,y)$ denotes the $k'^{th}$ input image or input matrix. $b_k^{(1)}$ denotes a bias kernel used for a convolution operation on the first convolution and pooling layer.

Referring to Equation 1, the first convolution and pooling layer may receive $F^{(0)}$ input images (or matrices) and generate $F^{(1)}$ output images (or matrices). A size of the image (or matrices) output by the convolution operation may be smaller than a size of the input image (or matrix). The output image (or matrix) may vary according to the kernel used for a convolution operation.

The first convolution and pooling layer may perform a pooling operation on $F^{(1)}$ output images (or matrices)

$$\tilde{a}_0^{(1)}$$

to $$\tilde{a}_{F(k)-1}^{(1)}.$$

The pooling operation may be an operation that reduces a size of the image or matrix by merging adjacent pixels or components of the image or matrix to obtain one representative value. For example, a pooling operation performed on the first convolution and pooling layer may be expressed as Equation 2.

$$a_k^{(1)}(x, y) = \max_{\substack{u \in \{0,1,\ldots,P^{(1)}-1\} \\ v \in \{0,1,\ldots,Q^{(1)}-1\}}} \tilde{a}_k^{(1)}(P^{(1)}x+u, Q^{(1)}y+v) \quad (2)$$

for $0 \le x \le M^{(1)} - 1 \left(M^{(1)} \equiv \dfrac{M^{(0)} - G^{(1)} + 1}{P^{(1)}}\right)$ and $0 \le y \le L^{(1)} - 1 \left(L^{(1)} \equiv \dfrac{L^{(0)} - K^{(1)} + 1}{Q^{(1)}}\right)$ In Equation 2, $a_k^{(1)}(x,y)$ denotes the kth output image for which a pooling operation is completed on the first convolution and pooling layer. $P^{(1)}$ denotes a merge size in a row direction on the first convolution and pooling layer and $Q^{(1)}$ denotes a merge size in a column direction on the first convolution and pooling layer. Referring to FIG. 2, the first convolution and pooling layer may select the maximum value of $P^{(1)} \times Q^{(1)}$ pixels or matrix components as a representative value. In this case, the pooling operation may be performed in such a manner that a pixel or component which has the maximum value is selected from adjacent pixels or components.

In another example, the pooling operation may be expressed as Equation 3.

$$a_k^{(1)}(t) = \dfrac{1}{P^{(1)}Q^{(1)}} \sum_{u=0}^{P^{(1)}-1} \sum_{v=0}^{Q^{(1)}-1} \tilde{a}_k^{(1)}(P^{(1)}x+u, Q^{(1)}y+v) \quad (3)$$

-continued $$\text{for } 0 \leq x \leq M^{(1)} - 1 \left( M^{(1)} \equiv \frac{M^{(0)} - G^{(1)} + 1}{P^{(1)}} \right) \text{ and}$$

$$0 \leq y \leq L^{(1)} - 1 \left( L^{(1)} \equiv \frac{L^{(0)} - K^{(1)} + 1}{Q^{(1)}} \right) \quad (5)$$

Referring to Equation 3, the first convolution and pooling layer may select a mean value of $P^{(1)} \times Q^{(1)}$ pixels or matrix components as a representative value. In this case, the pooling operation may be performed in such a manner that a mean value of adjacent pixels or components is calculated.

Referring back to FIG. 3, the CNN may include $N_C$ convolution and pooling layers. A convolution operation performed on the $l^{th}$ convolution and pooling layer may be expressed as Equation 4 by generalizing Equation 1.

$$\tilde{a}_k^{(l)}(x, y) = \phi^{(l)} \left( \sum_{k'=0}^{F^{(l-1)}-1} \sum_{u=0}^{G^{(l)}-1} \sum_{v=0}^{K^{(l)}-1} W_{kk'}^{(l)}(u, v) a_{k'}^{(l-1)}(x+u, y+v) + b_k^{(l)} \right)$$

$$= \phi^{(l)} \left( \sum_{k'=0}^{F^{(l-1)}-1} W_{kk'}^{(l)} * a_{k'}^{(l-1)} + b_k^{(l)} \right)$$

$$= \phi^{(l)}(z_k^{(l)}(x, y))$$

$$\text{for } 0 \leq x \leq M^{(l-1)} - G^{(l)}, 0 \leq y \leq L^{(l-1)} - K^{(l)}, \text{ and } 0 \leq k \leq F^{(l)} - 1 \quad (4)$$

In Equation 4, $\varphi^{(l)}(\cdot)$ denotes an activation function used in the $l^{th}$ convolution and pooling layer. $F^{(l-1)}$ denotes the number of images or matrices input to the $l^{th}$ convolution and pooling layer. $F^{(l-1)}$ may also denote the number of images or matrices output from the $(l-1)^{th}$ convolution and pooling layer. $F^{(l)}$ denotes the number of images or matrices output from the $l^{th}$ convolution and pooling layer. $G^{(l)}$ denotes the number of rows of a kernel used on the $l^{th}$ convolution and pooling layer. $K^{(l)}$ denotes the number of columns of a kernel used for a convolution operation in the $l^{th}$ convolution and pooling layer. $W_{kk'}^{(l)}(u,v)$ denotes a kernel that the $k^{th}$ node uses in performing a convolution operation on the $k'^{th}$ input image on the $l^{th}$ convolution and pooling layer. $a_{k'}^{(l-1)}(x,y)$ denotes the k'th input image or input matrix to the lth convolution and pooling layer. $b_k^{(l)}$ denotes a bias kernel used for a convolution operation in the $l^{th}$ convolution and pooling layer.

The pooling operation performed on the $l^{th}$ convolution and pooling layer may be expressed as Equation 5 by generalizing Equation 2.

$$a_k^{(l)}(x, y) = \max_{\substack{u \in \{0,1,\ldots,P^{(l)}-1\} \\ v \in \{0,1,\ldots,Q^{(l)}-1\}}} \tilde{a}_k^{(l)}(P^{(l)}x + u, Q^{(l)}y + v) \quad (5)$$

$$\text{for } 0 \leq x \leq M^{(l)} - 1 \left( M^{(l)} \equiv \frac{M^{(l-1)} - G^{(l)} + 1}{P^{(l)}} \right) \text{ and}$$

$$0 \leq y \leq L^{(l)} - 1 \left( L^{(l)} \equiv \frac{L^{(l-1)} - K^{(l)} + 1}{Q^{(l)}} \right)$$

In Equation 5, $a_k^{(l)}(x,y)$ denotes the kth output image for which a pooling operation is completed on the lth convolution and pooling layer. $P^{(l)}$ denotes a merge size in a row direction on the $l^{th}$ convolution and pooling layer and $Q^{(l)}$ denotes a merge size in a column direction on the $l^{th}$ convolution and pooling layer.

As another example of the pooling operation, the pooling operation performed on the $l^{th}$ convolution and pooling layer may be expressed as Equation 6 by generalizing Equation 3.

$$a_k^{(l)}(t) = \frac{1}{P^{(l)}Q^{(l)}} \sum_{u=0}^{P^{(l)}-1} \sum_{v=0}^{Q^{(l)}-1} \tilde{a}_k^{(l)}(P^{(l)}x + u, Q^{(l)}y + v) \quad (6)$$

$$\text{for } 0 \leq x \leq M^{(l)} - 1 \left( M^{(l)} \equiv \frac{M^{(l-1)} - G^{(l)} + 1}{P^{(l)}} \right) \text{ and}$$

$$0 \leq y \leq L^{(l)} - 1 \left( L^{(l)} \equiv \frac{L^{(l-1)} - K^{(l)} + 1}{Q^{(l)}} \right)$$

$F^{(N_C)}$ output images or output matrices having a size of $M^{(N_C)} \times L^{(N_C)}$ output from the last convolution and pooling layer (Layer $N_C$) may be expressed as follows.

$$a_k^{(N_C)}(x,y) \text{ for } 0 \leq k \leq F^{(N_C)}-1, 0 \leq x \leq M^{(N_C)}-1, \text{ and } 0 \leq y \leq L^{(N_C)}-1$$

The images or matrices output from the last convolution and pooling layer (Layer NC) may be input to the first whole connection layer (Layer $N_C+1$). The first whole connection layer may transform the input images into a one-dimensional vector, $a^{(N_C)}(t)$ for $0 \leq t \leq A^{(N_C)}-1$, having a size of $1 \times F^{(N_C)} M^{(N_C)} L^{(N_C)} (\equiv A^{(N_C)})$.

The first whole connection layer may multiply the transformed one-dimensional vector by a weight matrix. For example, an operation performed by the first whole connection layer may be expressed as Equation 7.

$$a^{(N_C+1)}(t) = \phi^{(N_C+1)} \left( \sum_{u=0}^{A^{(N_C)}-1} W^{(N_C+1)}(t, u) a^{(N_C)}(u) + b^{(N_C+1)}(t) \right) \quad (7)$$

$$= \phi^{(N_C+1)}(z^{(N_C+1)}(t))$$

$$\text{for } 0 \leq t \leq A^{(N_C+1)} - 1$$

In Equation 7, $W^{(N_C+1)}(t,u)$ denotes a weight matrix used in the first whole connection layer. $a^{(N_C+1)}(t)$ denotes a vector output from the first whole connection layer. $a^{(N_C+1)}(t)$ denotes a one-dimensional vector. $A^{(N_C+1)}$ denotes a size of a vector $a^{(N_C+1)}(t)$ output from the first whole connection layer.

Referring to Equation 7, the first whole connection layer may output a vector having a size of $A^{(N_C+1)}$ from a vector having a size of $A^{(N_C)}$ using the weight matrix.

Referring to FIG. 3, the CNN may include NF whole connection layers. An operation performed on the $l^{th}$ whole connection layer may be expressed as Equation 8 by generalizing Equation 7.

$$a^{(l)}(t) = \phi^{(l)}\left(\sum_{u=0}^{\Lambda^{(l-1)}-1} W^{(l)}(t,u)a^{(l-1)}(u) + b^{(l)}(t)\right) \quad (8)$$

$$= \phi^{(l)}(z^{(l)}(t)) \text{ for } 0 \leq t \leq \Lambda^{(l)} - 1$$

In Equation 8, $a^{(l)}(t)$ denotes an output vector of the $l^{th}$ whole connection layer. $W^{(l)}(t,u)$ denotes a weight matrix used in the $l^{th}$ whole connection layer. $\phi^{(l)}$ denotes an activation function used in the $l^{th}$ whole connection layer. $a^{(l-1)}(u)$ denotes an output vector of the $(l-1)^{th}$ whole connection layer and may be an input vector of the $l^{th}$ whole connection layer.

An output layer may receive an output vector $a^{(N_C+N_F)}(t)$ of the last whole connection layer. The output layer may perform a vector operation as shown in Equation 9.

$$z^{(N_C+N_F+1)}(t) = \quad (9)$$
$$\left(\sum_{u=0}^{\Lambda^{(N_C+N_F)}-1} W^{(N_C+N_F+1)}(t,u)a^{(N_C+N_F)}(u) + b^{(N_C+N_F+1)}(t)\right)$$

for $0 \leq t \leq C - 1$

In Equation 9, $$z^{(N_C+N_F+1)}(t)$$

is a vector output from the output layer. C denotes the number of classes of the output vector $$z^{(N_C+N_F+1)}(t).$$

The output layer may calculate a final output value for each class of the output vector $$z^{(N_C+N_F+1)}(t)$$

obtained by Equation 9. The output layer may calculate the final output value using the activation function. The calculation process of the final output value by the output layer may be expressed as Equation 10.

$$\hat{y}(t) = \phi^{(N_C+N_F+1)}(z^{(N_C+N_F+1)}(t)) \quad (10)$$

In Equation 10, $$\phi^{(N_C+N_F+1)}$$

denotes an activation function used in the output layer.

$$\phi^{(N_C+N_F+1)}$$

may be at least one of a sigmoid function, a hyper tangent function, and a rectifier linear unit. Referring to Equation 10, the output layer may calculate a final output value $\hat{y}(t)$ for the tth class of the output vector $$z^{(N_C+N_F+1)}(t).$$

In another example, the final output layer may calculate a final output value using a soft max function. The calculation process of the final output value by the output layer may be expressed as Equation 11.

$$\hat{y}(t) = \frac{\exp(z^{(N_C+N_F+1)}(t))}{\sum_{t'=0}^{C-1}\exp(z^{(N_C+N_F+1)}(t'))} \quad (11)$$

Referring to Equation 11, the final output layer may calculate the final output value using an exponential function for a class value of the output vector.

The apparatus 100 for machine learning may train the CNN by changing parameters that determine the CNN. For example, the apparatus 100 may train the CNN so that weight values between nodes of the CNN can be optimized.

The apparatus 100 may calculate a cost function using an output of the CNN regarding training data and weights between nodes of the CNN. The apparatus 100 may train the CNN so that the cost value is minimized.

For example, the cost function may be expressed as Equation 12.

$$J(W) = -\frac{1}{m}\left[\sum_{i=0}^{m-1}\sum_{t=0}^{C-1} |1_{\{y(i)=t\}} - \hat{y}_{(i)}(t)|^2\right] + \frac{\mu}{2}\|W\|^2 \quad (12)$$

In Equation 12, W may denote weight matrices, kernels, and biases of the CNN. i denotes an index of training data. m denotes the number of pieces of training data. $1_{\{y(i)=t\}}$ denotes a function which outputs 1 if $y(i)=t$ and otherwise, outputs 0.

In another example, the cost function may be expressed as Equation 13.

$$J(W) = \quad (13)$$
$$-\frac{1}{m}\left[\sum_{i=0}^{m-1}\sum_{t=0}^{C-1} 1_{\{y(i)=t\}} \log\frac{\exp(z_{(i)}^{(N_C+N_F+1)}(t))}{\sum_{t'=0}^{C-1}\exp(z_{(i)}^{(N_C+N_F+1)}(t'))}\right] + \frac{\mu}{2}\|W\|^2$$

The apparatus 100 for machine learning may change the weights between nodes so that the cost function J(W) is minimized. The apparatus 100 may train the neural network using an optimization algorithm, such as a backpropagation algorithm and stochastic gradient descent. In another example, the apparatus 100 may train the neural network by concurrently using a pre-training method based on greedy layer-wise training (Bengio, Yoshua, et al. "*Greedy layer-wise training of deep networks.*" Advances in neural information processing systems 19 (2007)) and a fine tuning method. In another example, the apparatus 100 may use drop-out (N. Srivastava, et al. "*Dropout: A simple way to prevent neural networks from overfitting.*" The Journal of Machine Learning Research (2014): 1929-1958) or max-out (Goodfellow, Ian J., et al. "*Maxout networks.*" arXiv preprint arXiv: 1302.4389 (2013)).

The structure and operation of the CNN are described above. The above description is merely illustrative, and the specific number, structure and operation process of layers may be changed easily by one of average skill in the art.

Hereinafter, a method of machine learning including an incremental learning process for a CNN according to an example embodiment of the present invention will be described.

Figure 7:
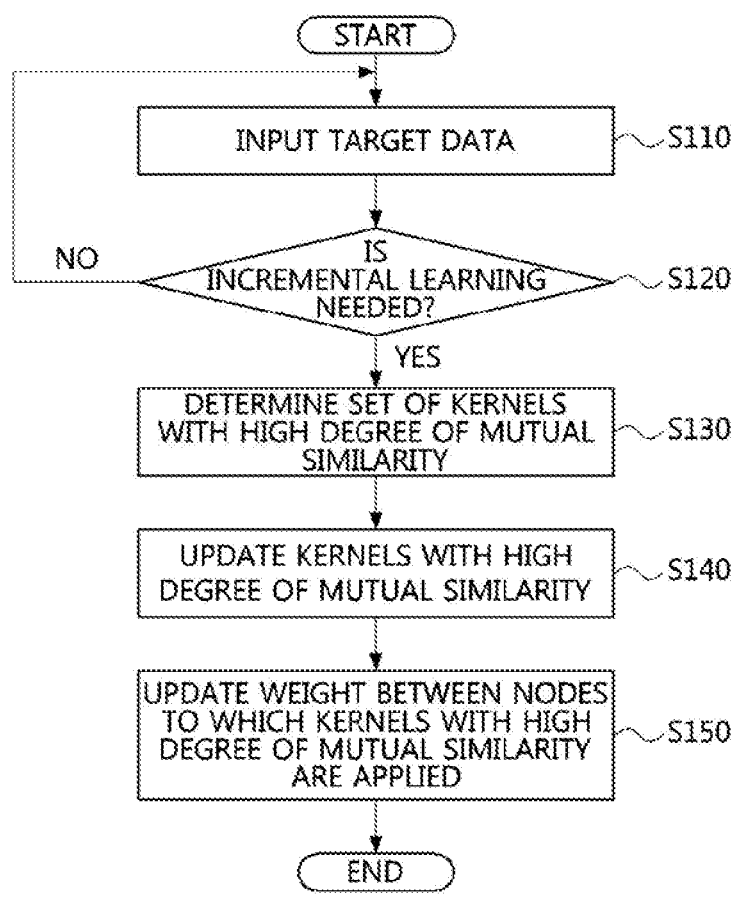
FIG. 7 is a flowchart illustrating a method of machine learning according to a second embodiment of the present invention.

FIG. 7 is a flowchart illustrating a method of machine learning according to a second embodiment of the present invention.

Referring to FIG. 7, in operation S110, an apparatus 100 for machine learning may receive input target data. The target data may be data different from training data previously used in training the CNN. The target data may be data for further training, or data to be analyzed by the CNN. The target data may be one piece of data or a data array consisting of a plurality of pieces of data.

In operation S120, a processor 110 may determine whether to initiate incremental learning on the basis of a difference between a statistical characteristic of the target data and a statistical characteristic of the previously used training data. The processor 110 may determine whether to initiate incremental learning by comparing an output statistic obtained when the target data is input to the CNN with an output statistic obtained when the training data is input to the CNN. Hereinafter, a process of determining whether to initiate the incremental learning will be described by taking, as an example, a case in which the target data is a data array consisting of a plurality of pieces of data.

When the target data is a data array consisting of D pieces of data, the processor 110 may determine a class $t^*_{(i)}$ for the $i^{th}$ data using Equation 14.

$$t^*_{(i)} = \arg\max_{0 \le t \le C-1} \hat{\gamma}_{(i)}(t) \tag{14}$$

Referring to Equation 14, the processor 110 may determine that a maximum value of values which are output when the $i^{th}$ data is input to the CNN is the class $t^*_{(i)}$.

The processor 110 may compare the class $t^*_{(i)}$, which corresponds to the maximum value of the output values of the CNN, with a predetermined reference value. The processor 110 may determine whether to initiate incremental learning based on the comparison result. For example, the processor 110 may determine whether to initiate incremental learning using Equation 15.

$$\left(\frac{1}{D}\sum_{i=0}^{D-1} 1_{\{\hat{\gamma}_{(i)}(t^*_{(i)})<\Gamma\}}\right) > B \tag{15}$$

In Equation 15, D denotes the number of pieces of data included in the data array. $1_{\{\hat{\gamma}_{(i)}(t^*_{(i)})<\Gamma\}}$ denotes a function which outputs 1 if $\hat{\gamma}_{(i)}(t^*_{(i)})<\Gamma$ is satisfied, and otherwise outputs 0.

Referring to Equation 15, when the $i^{th}$ data is input, the processor 110 may compare the maximum value $\hat{\gamma}_{(i)}(t^*_{(i)})$ among the output values of the CNN with the predetermined reference value $\Gamma$. When the number of pieces of data that satisfies $$\hat{\gamma}_{(i)}(t^*_{(i)}) < \Gamma$$

is greater than a reference number B, the processor 110 may determine that a statistical characteristic of the data array is different from a statistical characteristic of the previously used training data. When Equation 15 is satisfied, the processor 110 may determine that incremental learning is required and thus the incremental learning is to be initiated.

In the above description, the case in which the target data is the data array consisting of a plurality of pieces of data is taken as an example, but the embodiment is not limited thereto. For example, the target data may be one piece of data. In this case, when the target data is input to the CNN, the processor 110 may calculate a class $t^*$ that makes an output value $\hat{\gamma}(t)$ maximum. When $$\hat{\gamma}(t^*) < \Gamma$$

is satisfied, the processor 110 may determine to initiate incremental learning.

In operation S130, the processor 110 may determine a set of kernels with high similarity to each other in each of the convolution layers (or convolution and pooling layers) included in the CNN.

Figure 8:
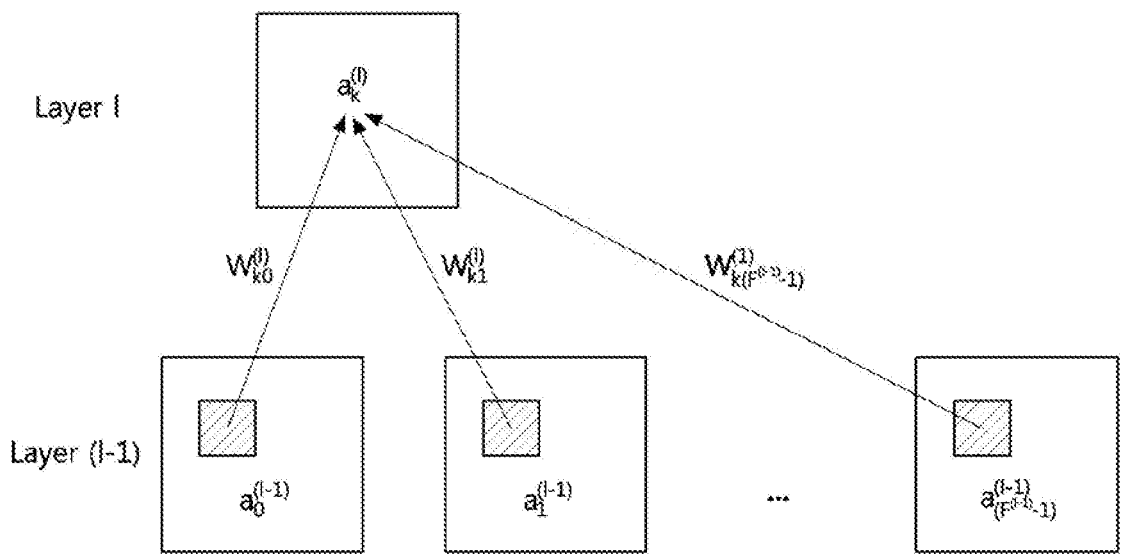
FIG. 8 is a conceptual diagram illustrating a first embodiment of a method of determining a set of kernels with a high degree of mutual similarity.

FIG. 8 is a conceptual diagram illustrating a first embodiment of a method of determining a set of kernels with a high degree of mutual similarity.

Referring to FIG. 8, the processor 110 may select kernels with high similarity to each other from among kernels used in generating the $k^{th}$ output image or matrix in an arbitrary $l^{th}$ convolution layer (or convolution and pooling layer). The processor 110 may determine at least one or more pairs of kernels with a high degree of mutual similarity by measuring a distance or similarity between the kernels. Specifically, the processor 110 may determine at least one pair of kernels with a high degree of mutual similarity on the basis of an absolute value of a difference between the kernels. For example, the processor 110 may determine a pair of kernels with a high degree of mutual similarity using Equation 16.

$$\{k^*_0, k^*_1\} = \arg\min_{\substack{\{k_0, k_1\} \\ k_0 \ne k_1}} d\left(W^{(l)}_{kk_0}, W^{(l)}_{kk_1}\right) \quad \begin{array}{l} W^{(l)}_{kk}(u,v) \to W^{(l)}_{kk'} \; (G^{(l)} \times K^{(l)} \text{ matrix}) \\ \text{for } 0 \le k_0, k_1 \le (F^{(l-1)} - 1) \end{array} \tag{16}$$

In Equation 16, $W^{(l)}_{kk_0}$ denotes a kernel that is used by the $k^{th}$ node for a convolution operation for the $k_0^{th}$ input image in order to generate the $k^{th}$ output image (or matrix) in the $l^{th}$ convolution layer (or convolution and pooling layer). $W^{(l)}_{kk_1}$ denotes a kernel that is used by the $k^{th}$ node for a convolution operation for the $k_1^{th}$ input image in order to generate the $k^{th}$ output image (or matrix) in the $l^{th}$ convolution layer (or convolution and pooling layer). In addition, d( ) denotes a function which outputs an absolute value of a difference between two kernels.

Referring to Equation 16, the processor 110 may determine that a pair of kernels which have the smallest absolute value of a difference therebetween and are used in generating the $k^{th}$ output image (or matrix) on the $l^{th}$ convolution layer (or convolution and pooling layer) is a pair of kernels with a high degree of mutual similarity. The processor 110 may determine only one pair of kernels with a high degree of mutual similarity for the given indices l and k. In another example, the processor 110 may determine a plurality of pairs of kernels with a high degree of mutual similarity for the given indices l and k. That is, the processor 110 may determine $M_c^{(l)}$ pairs of kernels with a high degree of mutual similarity among $(F^{(l-1)})$ kernels used in generating the kth output $a_k^{(l)}$ on the $l^{th}$ convolution layer (or convolution and pooling layer).

In this case, the processor 110 may repeat the process of selecting a pair of kernels according to Equation 16 a number of times, except for the previously selected pairs of kernels. For example, the processor 110 may determine $M_c^{(l)}$ kernel pairs by repeating a search operation for a pair of kernels with a high degree of mutual similarity $M_c^{(l)}$ times. In the lth convolution layer (or convolution and pooling layer), $F^{(l)}$ nodes may output $F^{(l)}$ output images (or matrices). Therefore, the processor 110 may determine a total of $F^{(l)}M_c^{(l)}$ pairs of kernels with a high degree of mutual similarity for each of the convolution layers (or convolution and pooling layers) through the above process.

A size of $M_c^{(l)}$ may vary according to the target data. For example, when the target data is a data array, the processor 110 may set $M_c^{(l)}$ to be greater as the data array includes more data whose statistical characteristics are different from those of the existing training data. For example, the processor 110 may set $M_c^{(l)}$ to be greater as a value of $$\frac{1}{D}\sum_{i=0}^{D-1} 1_{\{\hat{y}(i)(t_{(i)}^*) < \Gamma\}}$$

becomes greater.

In the above description, the processor 110 may determine a pair of kernels with a high degree of mutual similarity on the basis of the absolute value of a difference between the two kernels (or a distance between the two kernels). However, the embodiment is not limited thereto. For example, the processor 110 may determine the pair of kernels with a high degree of mutual similarity on the basis of at least one of a chordal distance between kernels (Conway, John H., Ronald H. Hardin, and Neil JA Sloane. "*Packing lines, planes, etc.: Packings in Grassmannian spaces.*" *Experimental mathematics* 5.2 (1996): 139-159), KL divergence, an intersection kernel, and a chi-square kernel.

Figure 9:
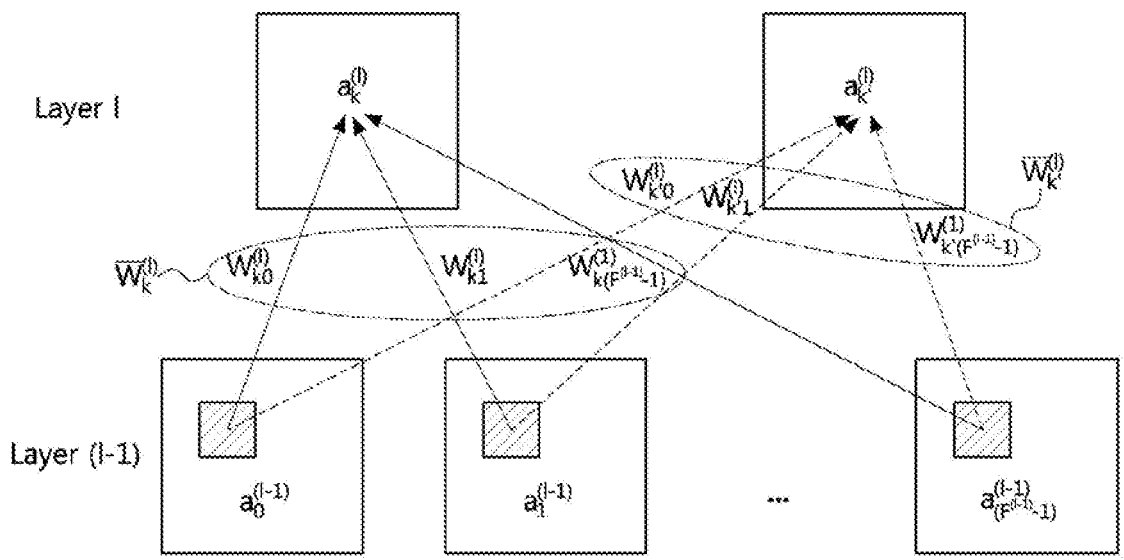
FIG. 9 is a conceptual diagram illustrating a second embodiment of a method of determining a set of kernels with a high degree of mutual similarity.

FIG. 9 is a conceptual diagram illustrating a second embodiment of a method of determining a set of kernels with a high degree of mutual similarity.

Referring to FIG. 9, a processor 110 may construct a concatenated kernel matrix from kernels used in a convolution operation of the same node. For example, the processor 110 may construct a concatenated kernel matrix $\overline{W}_k^{(l)}$ by connecting kernels $[W_{k0}^{(l)}, W_{k1}^{(l)}, \ldots, W_{k(\gamma^{(l-1)}-1)}^{(l)}]$ used by the kth node of the lth convolution layer (or convolution and pooling layer) to generate an output $a_k^{(l)}$. In addition, the processor 110 may construct a concatenated kernel matrix $\overline{W}_{k'}^{(l)}$ by connecting kernels $[W_{k'0}^{(l)}, W_{k'1}^{(l)}, \ldots, W_{k'(\gamma^{(l-1)}-1)}^{(l)}]$ used by the $k'^{th}$ node of the lth convolution layer (or convolution and pooling layer) to generate an output $a_{k'}^{(l)}$. The processor 110 may determine a set of kernels with a high degree of mutual similarity by comparing the two different concatenated kernel matrices $\overline{W}_k^{(l)}$ and $\overline{W}_{k'}^{(l)}$. For example, when the two concatenated kernel matrices $\overline{W}_k^{(l)}$ and $\overline{W}_{k'}^{(l)}$ have a high similarity therebetween, the kernels used in constructing the two concatenated kernel matrices $\overline{W}_k^{(l)}$ and $\overline{W}_{k'}^{(l)}$ may be included in the set of kernels with a high degree of mutual similarity.

The processor 110 may determine at least one pair of concatenated kernel matrices with a high degree of mutual similarity by measuring a distance or similarity between the concatenated kernel matrices. In a specific example, the processor 110 may determine a set of kernels with a high degree of mutual similarity on the basis of an absolute value of a difference between the concatenated kernel matrices. For example, the processor 110 may determine a set of kernels with a high degree of mutual similarity using Equation 17.

$$\{k_0^*, k_1^*\} = \arg\min_{\substack{\{k_0, k_1\} \\ k_0 \neq k_1}} d(\overline{W}_{k_0}^{(l)}, \overline{W}_{k_1}^{(l)}) \quad (17)$$

$$\text{for } 0 \leq k_0, k_1 \leq (F^{(l)} - 1)$$

In Equation 17, $\overline{W}_{k_0}^{(l)}$ denotes a concatenated kernel matrix consisting of kernels used to generate the $k_0^{th}$ output image (or matrix) in the $l^{th}$ convolution layer (or convolution and pooling layer). $\overline{W}_{k_1}^{(l)}$ denotes a concatenated kernel matrix consisting of kernels used to generate the $k_1^{th}$ output image (or matrix) in the $l^{th}$ convolution layer (or convolution and pooling layer). In addition, d( ) denotes a function which outputs an absolute value of a difference between two matrices.

Referring to Equation 17, the processor 110 may determine that a pair of concatenated kernel matrices whose absolute value of a difference therebetween is the smallest in the $l^{th}$ convolution layer (or convolution and pooling layer) are matrices with a high degree of mutual similarity. The processor 110 may include the kernels corresponding to the pair of concatenated kernel matrices with a high degree of mutual similarity in the set of kernels with a high degree of mutual similarity. The processor 110 may determine only one pair of concatenated kernel matrices with a high degree of mutual similarity in the $l^{th}$ convolution layer (or convolution and pooling layer). In another example, the processor 110 may determine a plurality of pairs of concatenated kernel matrices with a high degree of mutual similarity in the $l^{th}$ convolution layer (or convolution and pooling layer). For example, the processor 110 may determine $\tilde{M}_c^{(l)}$ pairs of concatenated kernel matrices in the $l^{th}$ convolution layer (or convolution and pooling layer).

In this case, the processor 110 may repeat the process of selecting a pair of kernels according to Equation 17 a number of times, except for previously selected pairs of concatenated kernel. For example, the processor 110 may determine $\tilde{M}_c^{(l)}$ kernel pairs by repeating a search operation for a pair of concatenated kernel matrices with a high degree of mutual similarity $\tilde{M}_c^{(l)}$ times.

A size of $\tilde{M}_c^{(l)}$ may vary according to the target data. For example, when the target data is a data array, the processor 110 may set $\tilde{M}_c^{(l)}$ to be greater as the data array includes more data whose statistical characteristics are different from those of the existing training data. For example, the processor 110 may set $\tilde{M}_c^{(l)}$ to be greater as a value of $$\frac{1}{D}\sum_{i=0}^{D-1} 1_{\{\hat{\gamma}(i)(t^*_{(i)})<\Gamma\}}$$

becomes greater.

In the above description, the processor 110 determines the pair of concatenated kernel matrices with a high degree of mutual similarity on the basis of an absolute value of a difference between the two matrices (or a distance between the two matrices). However, the embodiment is not limited thereto. For example, the processor 110 may determine the pair of concatenated kernel matrices with a high degree of mutual similarity on the basis of at least one of a chordal distance between kernels (Conway, John H., Ronald H. Hardin, and Neil JA Sloane. "*Packing lines, planes, etc.: Packings in Grassmannian spaces.*" Experimental mathematics 5.2 (1996): 139-159), KL divergence, an intersection kernel, and a chi-square kernel.

Referring back to FIG. 7, in operation S140, the processor 110 may update the kernels included in the set of kernels with a high degree of mutual similarity. For example, as shown in FIG. 8, when the processor 110 selects a plurality of pairs of kernels, the processor 110 may update the selected kernel pairs. The processor 110 may update the kernels with a high degree of mutual similarity using a random kernel. For example, a kernel update process by the processor 110 may be expressed as Equation 18.

$$W_{kk^*_0}^{(l)} \leftarrow \frac{1}{2}W_{kk^*_0}^{(l)} + \frac{1}{2}W_{kk^*_1}^{(l)} \tag{18}$$

$W_{kk^*_1}^{(l)}$ is randomly generated

Referring to Equation 18, with respect to kernels $W_{kk^*_0}^{(l)}$ and $W_{kk^*_1}^{(l)}$ with a high degree of mutual similarity which are determined by Equation 16, the processor 110 may update the kernel $W_{kk^*_0}^{(l)}$ by multiplying each of $W_{kk^*_0}^{(l)}$ and $W_{kk^*_1}^{(l)}$ by ½ and summing up the resulting values. The update may be performed by randomly generating the kernel $W_{kk^*_1}^{(l)}$.

In another example, as shown in FIG. 9, when the processor 110 selects a plurality of concatenated kernel matrices, the processor 110 may update kernels with a high degree of mutual similarity by updating the selected concatenated kernel matrices. For example, a process of updating the concatenated kernel matrices by the processor 110 may be expressed as Equation 19.

$$\overline{W}_{k^*_0}^{(l)} \leftarrow \frac{1}{2}\overline{W}_{k^*_0}^{(l)} + \frac{1}{2}\overline{W}_{k^*_1}^{(l)} \tag{19}$$

$\overline{W}_{k^*_1}^{(l)}$ is randomly generated

Referring to Equation 19, with respect to the concatenated kernel matrices $$\overline{W}_{k^*_0}^{(l)}$$

and $$\overline{W}_{k^*_1}^{(l)}$$

with a high degree of mutual similarity determined by Equation 17, the processor 110 may update the concatenated kernel matrix $$\overline{W}_{k^*_0}^{(l)}$$

by multiplying each of $$\overline{W}_{k^*_0}^{(l)} \text{ and } \overline{W}_{k^*_1}^{(l)}$$

by ½ and summing the resulting values. The update may be performed by randomly generating the concatenated kernel matrix $$\overline{W}_{k^*_1}^{(l)}.$$

The processor 110 may improve the performance of the CNN by updating the kernels with a high degree of mutual similarity. The processor 110 may not update the kernels with a high degree of mutual similarity. In this case, operation S140 may be omitted.

In operation S150, the processor 110 may update a weight between nodes to which the kernels with a high degree of mutual similarity are applied. The processor 110 may distinguish between a set of target weights to be updated and a set of weights not to be updated. For example, the processor 110 may distinguish between the sets of weights as follows.

$W=[W_N W_O]$ $W_N$: set of weights determined to be similar and be updated through the above process $W_O$: set of weights determined not to be updated through the above process The processor 110 may update the target weights by machine learning. For example, the processor 110 may select pieces of data to be used in machine learning from the target data. For example, when the target data is a data array including a plurality of pieces of data, the processor 110 may extract data whose statistical characteristic is different from a statistical characteristic of the existing training data. A process of extracting the data to be used in incremental learning by the processor 110 may be expressed as Equation 20.

$$B=\{i|\hat{\gamma}_{(i)}(t^*_{(i)})<\Gamma\} \tag{20}$$

In Equation 20, i denotes indices of pieces of data included in the data array. B denotes a set of indeces of pieces of data in the data array to be used in incremental learning. Referring to Equation 20, the processor 110 may select data that satisfies the condition of Equation 15 as data for incremental learning.

The processor 110 may update weights included in the set $W_N$ of weights using at least one of a supervised learning method and an unsupervised learning method. When the processor 110 uses the supervised learning method, pieces of data included in the index set B may be labeled for supervised learning. When the pieces of data have not been labelled, a labeling process may be further performed.

A process of updating the weights may be expressed as Equation 21.

$$\Delta W_N(n) = \alpha \, \Delta W_N(n-1) - \gamma(n)\left(\frac{\partial J(W)}{\partial W_N} + \mu W_N(n-1)\right) \quad (21)$$

$$W_N(n) = W_N(n-1) + \Delta W_N(n)$$

$$W_O(n) = W_O(n-1)$$

In Equation 21, J(W) denotes a cost function and may be defined by Equation 12, Equation 13, or the like. $W_N$ denotes a set of target weights between nodes which are to be updated. $W_O$ denotes a set of weights between nodes which are not to be updated. n denotes an index of the nth component of the sets $W_N$ and $W_O$. $\gamma$ denotes a learning rate, $\alpha$ denotes a momentum, and $\mu$ denotes a decay coefficient.

The processor 110 may train the neural network using an optimization algorithm, such as a backpropagation algorithm and stochastic gradient descent. In another example, the processor 110 may train the neural network by concurrently using a pre-training method based on greedy layer-wise training (Bengio, Yoshua, et al. "*Greedy layer-wise training of deep networks.*" *Advances in neural information processing systems* 19 (2007)) and a fine tuning method.

When the machine learning process using the data set B shown in Equation 20 is completed, the processor 110 may perform further machine learning using the entire data (i.e., both of the previously used training data and the target data). The processor 110 may perform further machine learning using drop-out (N. Srivastava, et al. "*Dropout: A simple way to prevent neural networks from overfitting.*" *The Journal of Machine Learning Research* (2014): 1929-1958) or max-out (Goodfellow, Ian J., et al. ' "*Maxout networks.*" *arXiv preprint arXiv:* 1302.4389 (2013)).

Figure 10:
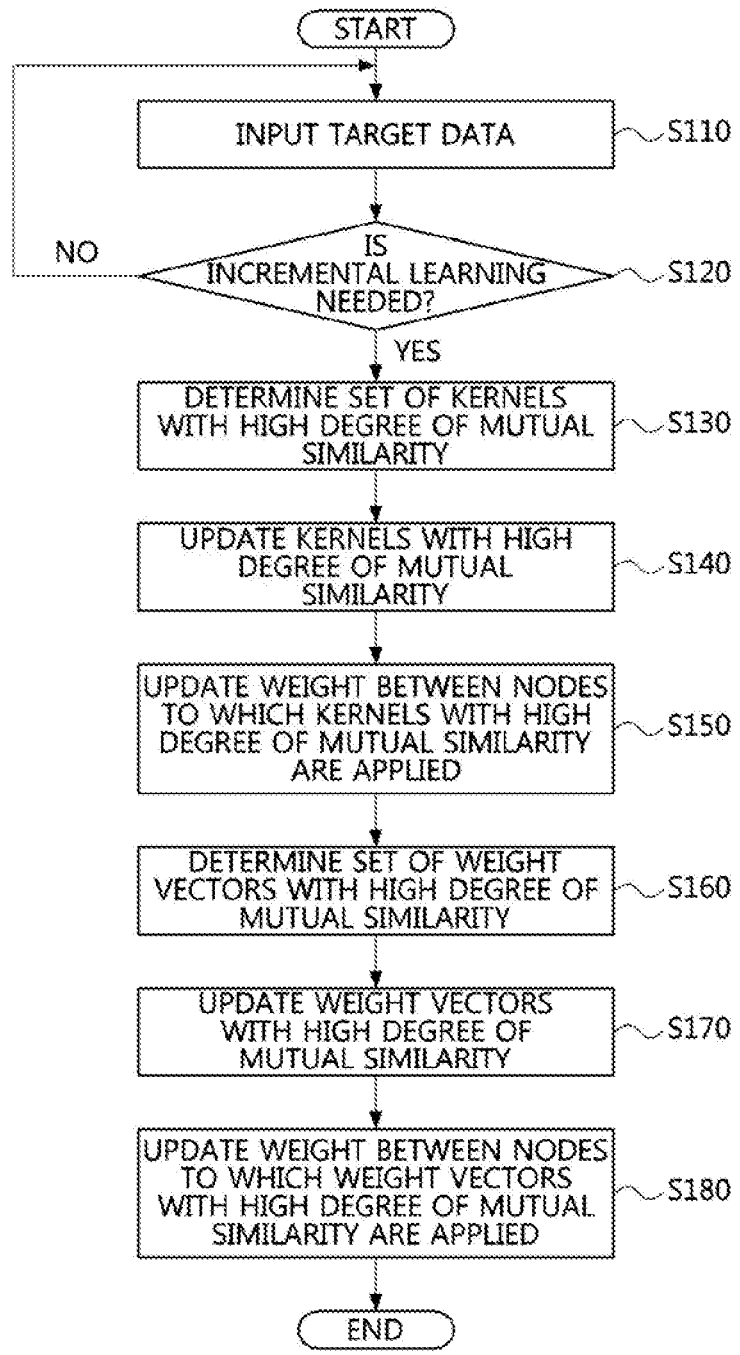
FIG. 10 is a conceptual diagram illustrating a method of machine learning according to a third embodiment of the present invention.

FIG. 10 is a conceptual diagram illustrating a method of machine learning according to a third embodiment of the present invention.

In describing the embodiment of FIG. 10, contents redundant to what has been described with reference to FIG. 9 will be omitted.

Referring to FIG. 10, in operation S160, a processor 110 may determine a set of weight vectors with a high degree of mutual similarity from each of an entirety of the connection layers of a CNN. The weight vectors may be extracted from the weight matrix shown in Equation 7. For example, the processor 110 may extract weight vectors as shown in Equation 22.

$$W_t^{(l)} = [W^{(l)}(t,0) \ldots W^{(l)}(t,\Lambda^{(l-1)}-1)] \quad (22)$$

Referring to Equation 22, the processor 110 may extract each column of a weight matrix $W^{(l)}(t,u)$ as a weight vector $W_t^{(l)}$. However, the embodiment is not limited thereto. For example, the processor 110 may extract each row of the weight matrix $W^{(l)}(t,u)$ as the weight vector.

The processor 110 may determine at least one pair of weight vectors with a high degree of mutual similarity by measuring a distance or similarity between weight vectors. In a specific example, the processor 110 may determine at least one pair of weight vectors with a high degree of mutual similarity on the basis of an absolute value of a difference between weight vectors. For example, the processor 110 may determine a pair of weight vectors with a high degree of mutual similarity using Equation 23.

$$\{t_0^*, t_1^*\} = \arg\min_{\substack{\{t_0, t_1\} \\ t_0 \neq t_1}} d\!\left(w_{t_0}^{(l)}, w_{t_1}^{(l)}\right) \quad (23)$$

$$\text{for } 0 \leq t_0, t_1 \leq (\Lambda^{(l)} - 1)$$

In Equation 23, $w_{t_0}^{(l)}$ denotes a weight vector corresponding to the $t_0^{th}$ column in the weight matrix of the $l^{th}$ whole connection layer. $w_{t_1}^{(l)}$ denotes a weight vector corresponding to the $t_1^{th}$ column in the weight matrix of the $l^{th}$ whole connection layer. d( ) denotes a function which outputs an absolute value of a difference between two vectors.

Referring to Equation 23, the processor 110 may determine that a pair of weight vectors whose absolute value of a difference therebetween is the smallest in the lth whole connection layer is a pair of weight vectors with a high degree of mutual similarity. The processor 110 may determine only one pair of weight vectors with a high degree of mutual similarity in the $l^{th}$ whole connection layer. In another example, the processor 110 may determine a plurality of pairs of weight vectors with a high degree of mutual similarity in the $l^{th}$ whole connection layer. The processor 110 may determine $M_f^{(l)}$ pairs of weight vectors with high mutual similarity in the $l^{th}$ whole connection layer.

In this case, the processor 110 may repeat a process of selecting a pair of weight vectors according to Equation 23 a number of times, except for previously selected pairs of weight vectors. For example, the processor 110 may determine $M_f^{(l)}$ weight vector pairs by repeating a search operation for a pair of weight vectors with a high degree of mutual similarity $M_f^{(l)}$ times.

A size of $M_f^{(l)}$ may vary according to the target data. For example, when the target data is a data array, the processor 110 may set $M_f^{(l)}$ to be greater as the data array includes more data whose statistical characteristics are different from those of the existing training data. For example, the processor 110 may set $M_f^{(l)}$ to be greater as a value of $$\frac{1}{D}\sum_{i=0}^{D-1} 1_{\{\tilde{\gamma}(i)(t_{(i)}^*) < \Gamma\}}$$

becomes greater.

In the above description, the processor 110 may determine a pair of weight vectors with a high degree of mutual similarity on the basis of the absolute value of a difference between two weight vectors (or a distance between two weight vectors). However, the embodiment is not limited thereto. For example, the processor 110 may determine the pair of weight vectors with a high degree of mutual similarity on the basis of at least one of a squared difference between weight vectors, p-norm, Euclidean-norm, a cosine distance, a Mahalanobis distance, a chordal distance, KL divergence, an intersection kernel, and a Chi-square kernel.

In operation S170, the processor 110 may update the weight vectors with a high degree of mutual similarity. The processor 110 may update the weight vectors with a high degree of mutual similarity using a random vector. For example, a process of updating a kernel by the processor 110 may be expressed as Equation 24.

$$w_{t_0}^{(l)} \leftarrow \frac{1}{2} w_{t_0}^{(l)} + \frac{1}{2} w_{t_1}^{(l)} \quad (24)$$

$w_{t_1}^{(l)}$ is randomly generated

Referring to Equation 24, with respect to the weight vectors $w_{t^*_0}^{(l)}$ and $w_{t^*_1}^{(l)}$ with a high degree of mutual similarity which are determined by Equation 23, the processor 110 may update the weight vector $w_{t^*_0}^{(l)}$ by multiplying each of the weight vectors $w_{t^*_0}^{(l)}$ and $w_{t^*_1}^{(l)}$ by ½ and summing the resulting values. The update may be performed by randomly generating the weight vector $w_{t^*_1}^{(l)}$.

In another example, the processor 110 may update the weight vector as shown in Equation 25.

$$w_{t^*_0}^{(l)} \leftarrow \frac{\sum_{i \in B} \left( \frac{\exp(z_{(i)}^{(l)}(t^*_0))}{\sum_t \exp(z_{(i)}^{(l)}(t))} w_{t^*_0}^{(l)} + \frac{\exp(z_{(i)}^{(l)}(t^*_1))}{\sum_t \exp(z_{(i)}^{(l)}(t))} w_{t^*_1}^{(l)} \right)}{\sum_{i \in B} \left( \frac{\exp(z_{(i)}^{(l)}(t^*_0))}{\sum_t \exp(z_{(i)}^{(l)}(t))} + \frac{\exp(z_{(i)}^{(l)}(t^*_1))}{\sum_t \exp(z_{(i)}^{(l)}(t))} \right)} \quad (25)$$

$w_{t^*_1}^{(l)}$ is randomly generated

In another example, the processor 110 may not update the weight vector.

In operation S180, the processor 110 may update a weight between the nodes to which the weight vectors with a high degree of mutual similarity are applied.

The processor 110 may distinguish between a set of target weights to be updated and a set of other weights on the basis of the selected weight vectors with a high degree of mutual similarity. The processor 110 may select data for incremental learning as shown in Equation 20. The processor 110 may update the target weights using the data for incremental learning as described with reference to Equation 21. The processor 110 may perform further learning for the CNN using the entirety of the data.

When the target data has not been labelled, the processor 110 may train the CNN through unsupervised learning without a labelling process. In this case, the processor 110 may connect the CNN and a symmetric neural network which is structurally symmetrical to the CNN. The processor 110 may input outputs of the CNN to the symmetric neural network.

Figure 11:
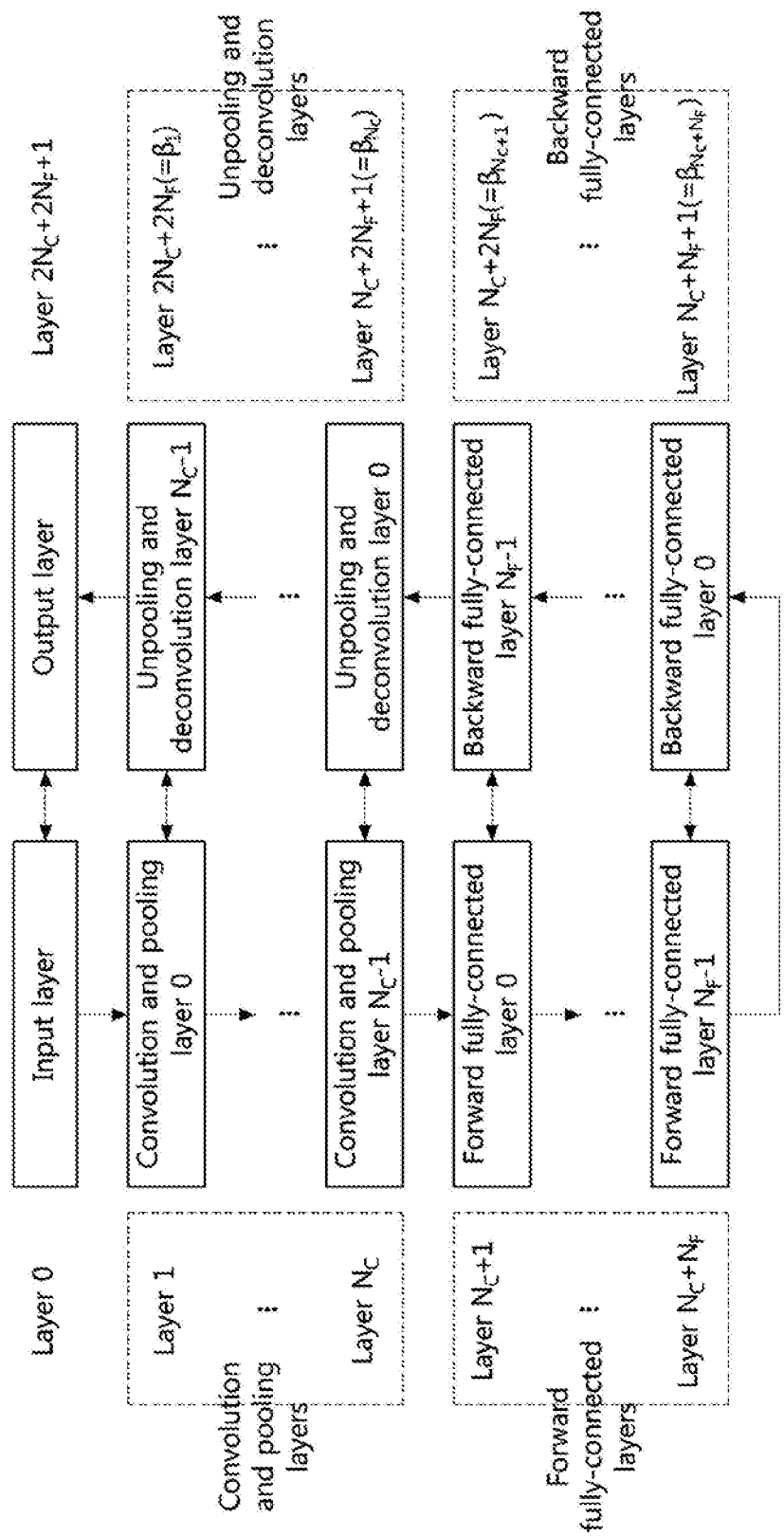
FIG. 11 is a conceptual diagram illustrating a neural network according to a fourth embodiment of the present invention.

FIG. 11 is a conceptual diagram illustrating a neural network according to a fourth embodiment of the present invention.

Referring to FIG. 11, the neural network may include a CNN and a symmetric neural network. The symmetric neural network may be structurally symmetrical to the CNN. The symmetric neural network may include a backward fully connected layer corresponding to a whole connection layer of the CNN and a deconvolution layer and an unpooling layer which correspond to a convolution layer and a pooling layer of the CNN, respectively. A description of the specific operation of the symmetric neural network is given in Korean Patent Application No. 10-2015-183898.

The processor 110 may update a weight between nodes on the basis of a difference between an output of the symmetric neural network and an input to the CNN. For example, the processor 110 may determine a cost function based on at least one of a reconstruction error and a mean squared error between the output of the symmetric neural network and the input to the CNN. The processor 110 may update the weight between the nodes such that the cost function determined as described above is minimized. The processor 110 may train the CNN using the data set B shown in Equation 20. The processor 110 may train the CNN using the entirety of the data. When the learning process is completed, the processor 110 may remove the symmetric neural network.

The apparatus and method for machine learning according to the example embodiments of the present invention have been described above with reference to FIGS. 1 to 11 and Equations 1 to 25. According to the above embodiments, it is possible to find target data which has a different statistical characteristic from that of the training data used in training of the CNN. When the target data which has a different statistical characteristic is found, incremental learning is initiated for the CNN, thereby improving the performance of the CNN. In addition, it is possible to increase machine learning efficiency by selectively updating a weight between nodes to which kernels or weight vectors with a high degree of mutual similarity are applied.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The program instructions recorded in the computer-readable storage media may be those specially designed and constructed for the purposes of the present invention, or they may be of the kind well-known and available to those skilled in the computer software arts.

Examples of the computer-readable recording medium may include hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

While the example embodiments of the present invention and their advantages have been described in detail, it should be understood that various changes, substitutions and alterations may be made herein without departing from the scope of the invention.

What is claimed is:

1. A method of machine learning for a convolutional neural network (CNN), the method comprising:
   receiving input target data;
   determining whether to initiate incremental learning on the basis of a difference between a statistical characteristic of the target data with respect to the CNN and a statistical characteristic of previously used training data with respect to the CNN:
   determining a set of kernels with a high degree of mutual similarity in each of convolution layers included in the CNN when the incremental learning is determined to be initiated;
   updating each kernel included in the set of kernels by calculating a random matrix with each of the kernels included in the set of kernels with the high degree of mutual similarity; and
   updating a weight between nodes to which kernels included in the set of kernels with a high degree of mutual similarity are applied,
   wherein the determining of the set of kernels with the high degree of mutual similarity comprises:

constructing concatenated kernel matrices from kernels used in a convolution operation of the node;
measuring similarity between the concatenated kernel matrices based on an absolute value of a difference between the concatenated kernel matrices; and
determining a pair of the kernels with the smallest absolute value of the difference between the concatenated kernel matrices, wherein the pair of the kernels belongs to the set of the kernels,
wherein determining of whether to initiate the incremental learning comprises when the target data is a data array consisting of a plurality of pieces of data, it is determined that the incremental learning is initiated when the number of pieces of data, which are included in the data array and satisfy a condition in which a maximum value among output values of the CNN is less than the predetermined reference value, is greater than or equal to a reference number,
when it is determined that the incremental learning is initiated determining a set of weight vectors with a high degree of mutual similarity in each fully connected layer included in the CNN; and
updating a weight between nodes to which weight vectors included in the set of weight vectors with a high degree of mutual similarity;
wherein the determining of the set of weight vectors with a high degree of mutual similarity comprises measuring at least one pair of the weight vectors with a high degree of mutual similarity by measuring a distance or similarity between weight vectors.

2. The method of claim 1, wherein the determining of whether to initiate the incremental learning comprises comparing a maximum value, among output values of the CNN regarding the target data with a predetermined reference value and determining to initiate the incremental learning when the maximum value is less than the reference value.

3. The method of claim 1, wherein the determining of the set of weight vectors with a high degree of mutual similarity comprises determining at least one pair of the weight vectors with a high degree of mutual similarity on the basis of at least one of an absolute value of a difference between weight vectors, a squared difference, p-norm, Euclidean-norm, a cosine distance, a Mahalanobis distance, a chordal distance, KL divergence, an intersection kernel, and a Chi-square kernel.

4. The method of claim 1, further comprising updating each weight vector included in the set of weight vectors with a high degree of mutual similarity using a random vector.

5. The method of claim 1, wherein the updating of the weight between the nodes comprises updating the weight between the nodes using at least one of a supervised learning method and an unsupervised learning method.

6. The method of claim 5, wherein when the weight between the nodes is updated using the unsupervised learning method, an output of the CNN is input to a symmetric neural network which is structurally symmetrical to the CNN and the weight between the nodes is updated on the basis of a difference between an output of the symmetric neural network and an input to the CNN.

7. The method of claim 6, wherein the symmetric neural network includes a backward fully connected layer corresponding to a whole connection layer of the CNN and a deconvolution layer and an unpooling layer which correspond to a convolution layer and a pooling layer of the CNN.

8. An apparatus for machine learning for training a convolutional neural network (CNN), the apparatus comprising:

a processor; and
a memory in which at least one command executed by the processor is stored, wherein the at least one command is executed to:
receive input target data;
determine whether to initiate incremental learning on the basis of a difference between a statistical characteristic of the target data with respect to the CNN and a statistical characteristic of previously used training data with respect to the CNN;
determine a set of kernels with a high degree of mutual similarity in each of convolution layers included in the CNN when the incremental learning is determined to be initiated;
update each kernels included in the set of kernels by calculating a random matrix with each kernel included in the set of kernels with the high degree of mutual similarity; and
update a weight between nodes to which kernels included in the set of kernels with a high degree of mutual similarity are applied,
wherein the at least one command is executed to: construct concatenated kernel matrices from kernels used in a convolution operation of the node;
measure similarity between the concatenated kernel matrices based on an absolute value of a difference between the concatenated kernel matrices; and
determine a pair of the kernels with the smallest absolute value of the difference between the concatenated kernel matrices, wherein the pair of the kernels belongs to the set of the kernels,
wherein the at least one command is further executed to:
compare a maximum value among output values of the CNN regarding the target data with a predetermined reference value and determine to initiate the incremental learning when the target data is a data array consisting of a plurality of pieces of data, it is determined that the incremental learning is initiated when the number of pieces of data, which are included in the data array and satisfy a condition in which a maximum value among output values of the CNN is less than the predetermined reference value, is greater than or equal to a reference number
when it is determined that the incremental learning is initiated, determine a set of included in the CNN; and
update a weight between nodes to which weight vectors included in the set of weight vectors with a high degree of mutual similarity;
wherein the determining of the set of weight vectors with a high degree of mutual similarity comprises measuring at least one pair of the weight vectors with a high degree of mutual similarity by measuring a distance or similarity between weight vectors.

9. The apparatus of claim 8, wherein the at least one command is executed, when it is determined that the incremental learning is initiated, to determine a set of weight vectors with a high degree of mutual similarity in each fully connected layer included in the CNN and update a weight between nodes to which weight vectors included in the set of weight vectors with a high degree of mutual similarity.

10. The apparatus of claim 8, wherein the at least one command is executed to determine at least one pair of the weight vectors with a high degree of mutual similarity on the basis of an absolute value of a difference between weight vectors.

* * * * *